April 22, 1930. M. H. SUSSMAN 1,755,799
WELDING MACHINE
Filed June 29, 1929 5 Sheets-Sheet 1
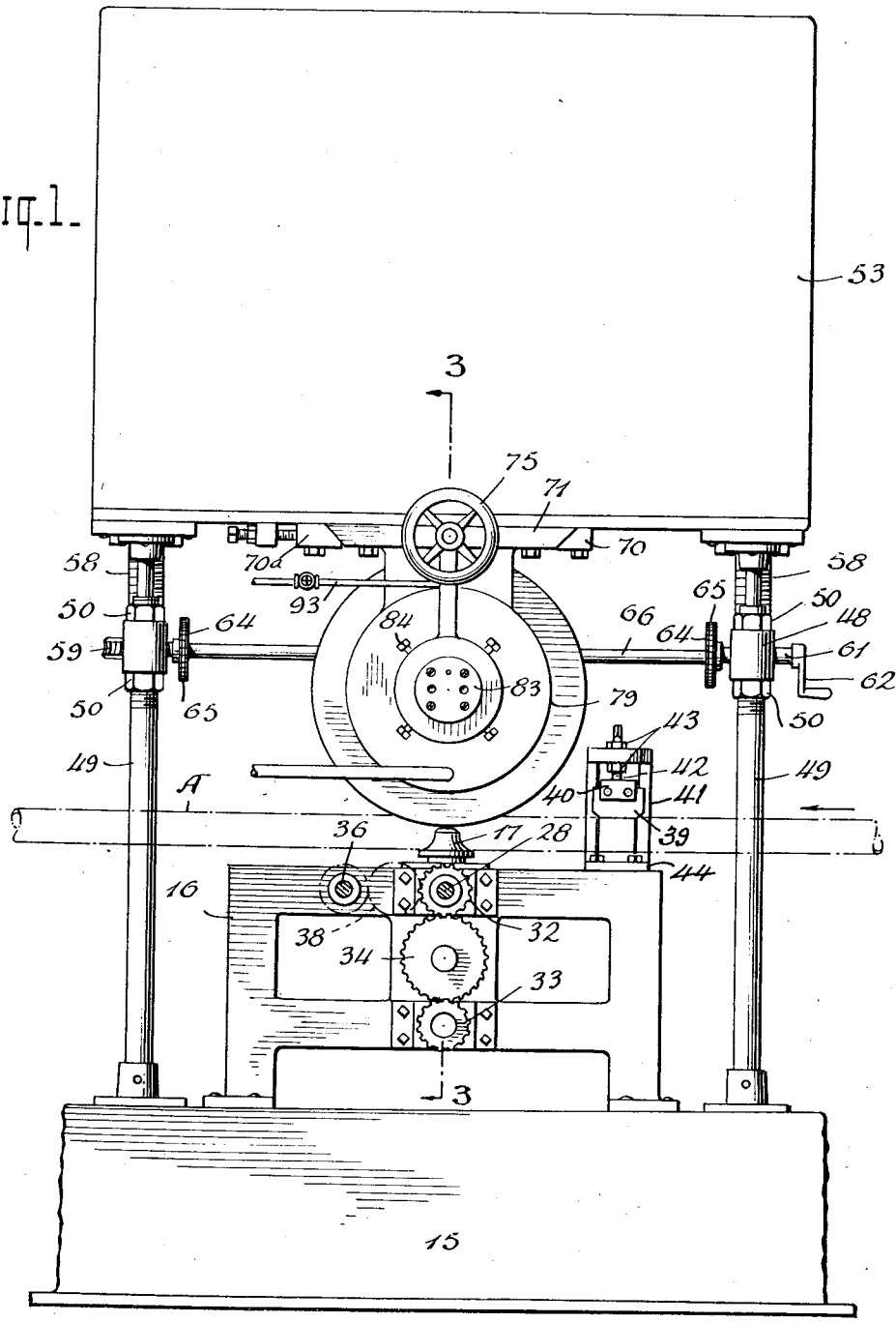
INVENTOR
MAXWELL H. SUSSMAN
BY
ATTORNEYS

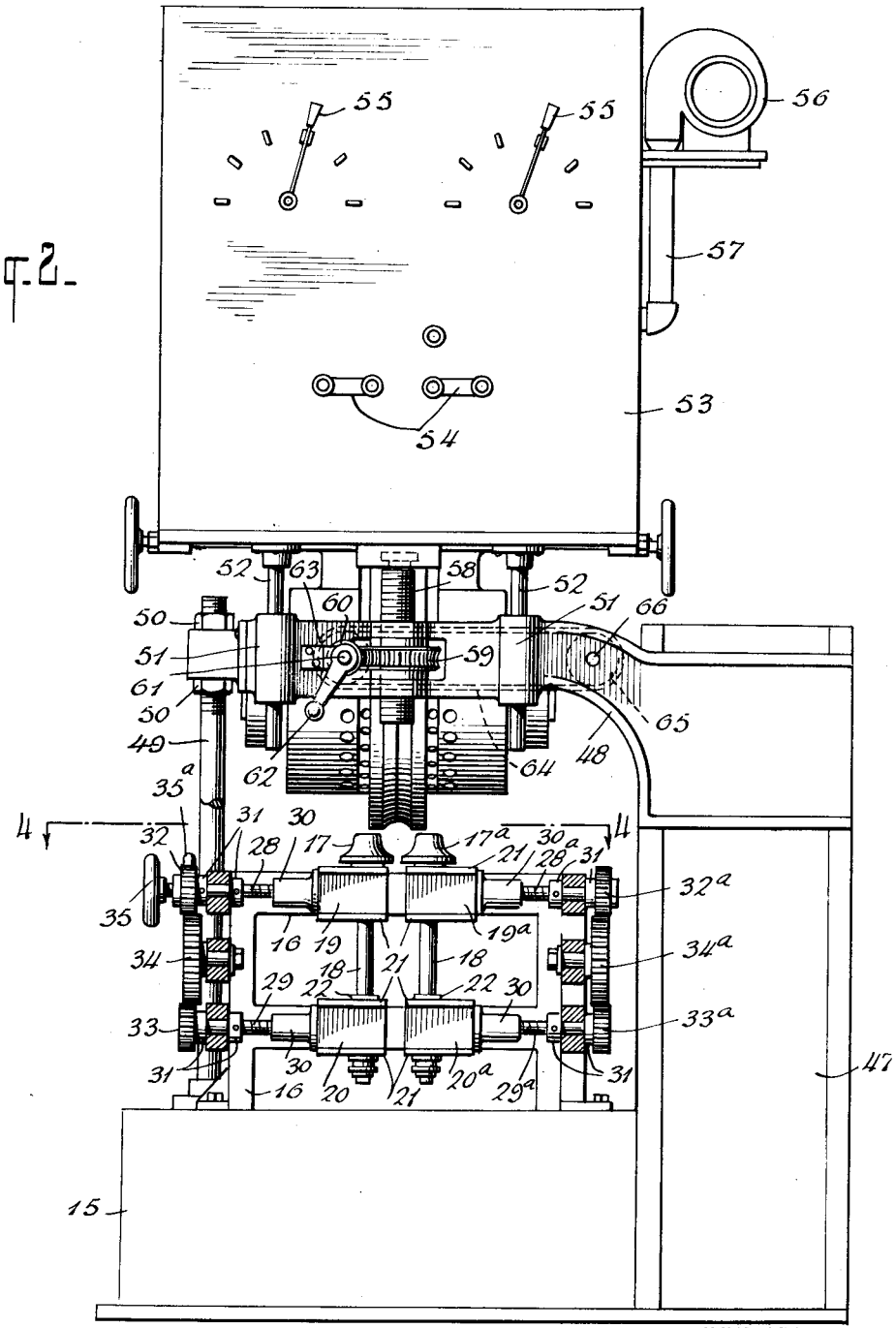

April 22, 1930.  M. H. SUSSMAN  1,755,799
WELDING MACHINE
Filed June 29, 1929  5 Sheets-Sheet 3

INVENTOR
MAXWELL H. SUSSMAN
BY
ATTORNEYS

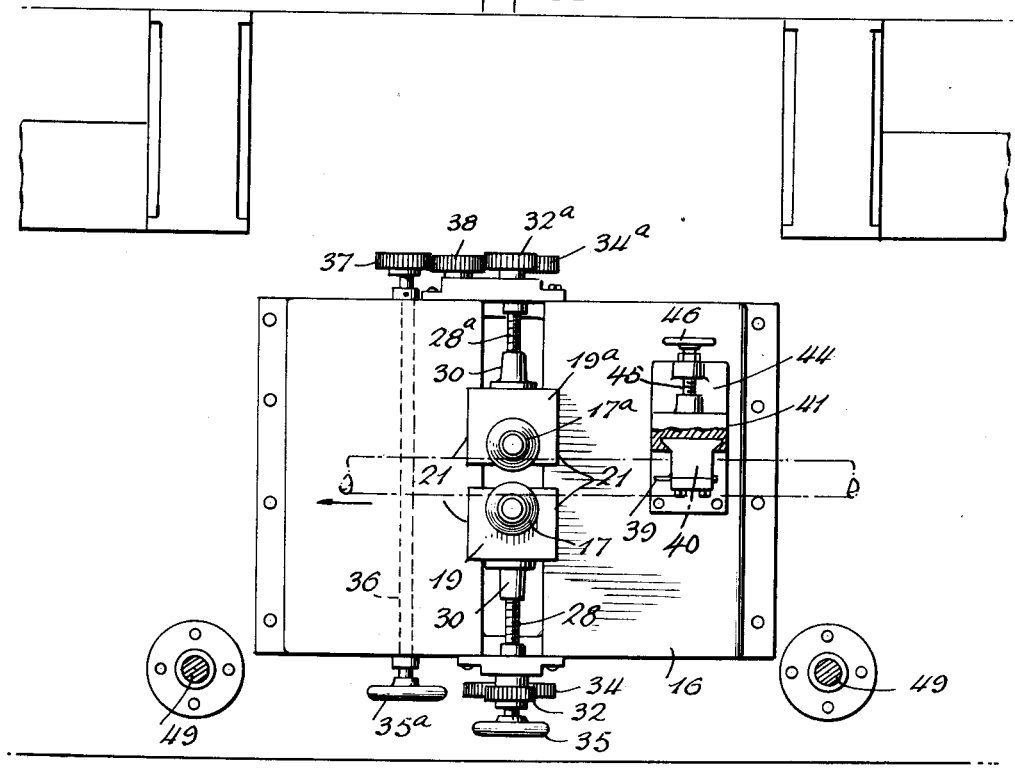
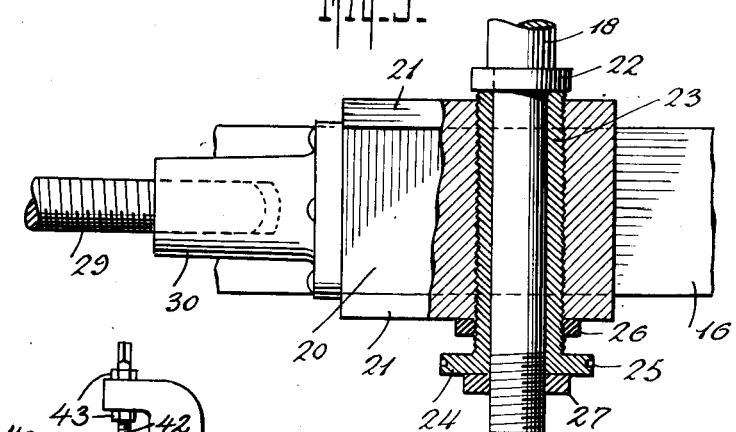
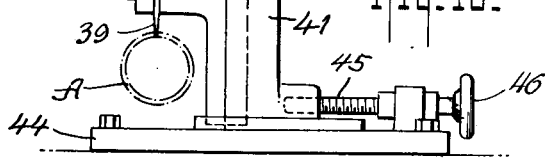

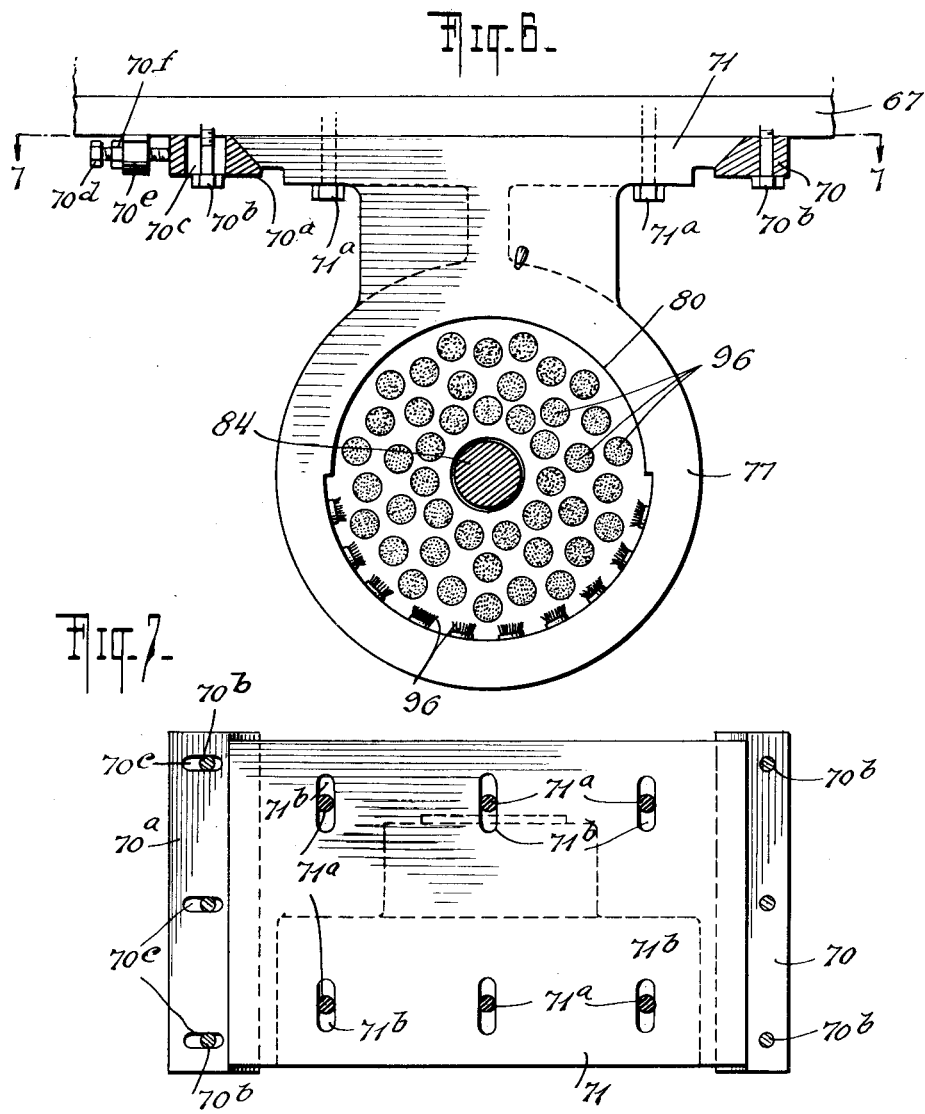

Patented Apr. 22, 1930

1,755,799

UNITED STATES PATENT OFFICE

MAXWELL H. SUSSMAN, OF KEW GARDENS, NEW YORK

WELDING MACHINE

Application filed June 29, 1929. Serial No. 374,705.

My invention relates to electric welding machines of the type which are designed for butt welding steel stock, and more particularly to that class of such machines intended for butt welding metallic tubing. The object of the invention is to provide a welding machine of simple construction whereby all and particularly large heavy work may be accomplished in an efficient manner. The invention contemplates further the provision of novel contact members or brushes constructed in a manner to provide electrical contact of maximum efficiency, and which may be made and maintained in an economical manner. Other objects will appear from the description hereinafter and the features of novelty will be pointed out in the claims.

In the accompanying drawings, which illustrate an example of the invention without defining its limits, Fig. 1 is a front elevation of the novel machine with parts in section; Fig. 2 is a side elevation thereof with parts in section; Fig. 3 is a fragmentary vertical section on an enlarged scale taken on the line 3—3 of Fig. 1; Fig. 4 is a horizontal section on the line 4—4 of Fig. 2; Fig. 5 is a detail view illustrating an adjustment which forms part of the machine; Fig. 6 is a fragmentary section on the line 6—6 of Fig. 3; Fig. 7 is a horizontal section on the line 7—7 of Fig. 6; Fig. 8 is a central section of the novel electrode included in the machine; Fig. 9 is an end view thereof; and Fig. 10 is a detail view of a tube guiding device forming part of the machine.

For the purpose of description and illustration the novel machine is shown in a form for butt welding tubing for which it is particularly adapted, it being understood however that this is not intended to define the limits of utility of the invention.

In practice the novel welding machine may comprise an intermediate part of an installation consisting, in addition, of a forming apparatus and a finishing machine located upon opposite sides of said welding machine; it will of course be obvious that, if desired, the latter may be utilized as an independent unit. The base 15, shown in the drawings, may accordingly comprise a separate element or it may be constructed to form a support for the other mechanical units of the aforesaid installation.

In any case the base 15 constitutes a support for a frame, table or equivalent device 16 on which the side pressure rolls 17 and 17$^a$ are mounted preferably so as to be adjustable both horizontally and vertically; in the example illustrated in the drawings, the rolls 17 and 17$^a$ are accordingly secured upon vertical shafts 18 which are journalled in upper boxes 19 and 19$^a$, and lower boxes 20 and 20$^a$ provided with horizontal flanges 21 which are slidably guided upon the frame 16 in horizontal directions, as shown in Figs. 2 and 4. For the purpose of effecting the vertical adjustment of the rolls 17 and 17$^a$, the shafts 18 are provided with collars 22 which rest upon sleeves 23 externally threaded for screw-threaded engagement with the lower boxes 20 and 20$^a$ whereby said sleeves 23 are carried; to facilitate the manipulation of said sleeves 23 they may include annular flanges 24 suitably recessed as indicated at 25 or otherwise constructed for the accommodation of a conventional wrench or other tool. For securing the sleeves 23 in adjusted positions lock nuts 26 may be provided thereon for engagement with the boxes 20, 20$^a$, while additional lock nuts 27 are threaded upon the screwthreaded ends of the shafts 18 for engagement with the lower ends of said sleeves 23 as illustrated in Fig. 5. It will be obvious that, as the sleeves 23 are screwed up or down in the boxes 20, 20$^a$, the shafts 18 will be correspondingly shifted in vertical directions so that the positions of the rolls 17 and 17$^a$ may be vertically varied relatively to the boxes 19 and 19$^a$.

Any suitable means may be provided for effecting the horizontal adjustment of said rolls 17 and 17$^a$ relatively to each other, and to the electrodes to be more fully described hereinafter. In the drawings the means in question consists of externally threaded shafts 28 and 29 threaded into internally threaded bosses 30 secured to or forming integral parts of the boxes 19 and 20. and corresponding shafts 28$^a$ and 29$^a$ threaded into internally threaded bosses carried by the boxes 19ª and 20ª. As shown in Fig. 2, the several shafts 28, 29, 28ª and 29ª are rotatably mounted in suitable members of the frame or table 16 and are provided with collars 31 in engagement with said members of the frame 16 and arranged to prevent lengthwise movement of said shafts without interfering with the rotation thereof. For the purpose of simultaneously adjusting the boxes 19 and 20, and 19ª and 20ª in pairs in a manner to maintain the shafts 18 always in proper vertical positions, the shafts are provided respectively with gears 32, 33, 32ª and 33ª geared together in co-operating pairs by gears 34 and 34ª suitably journalled upon the frame or table 16 as illustrated in Fig. 2. To facilitate the operation of the aforesaid gearing a handwheel 35 is fixed, for instance, upon the shaft 28, which a second hand wheel 35ª is secured upon a counter shaft 36 journalled on the table or frame 16 and carrying a pinion 37 which is connected by means of a gear 38 with the gear 34ª. With this arrangement both handwheels 35 and 35ª are located upon the same side of the machine within easy reach, without requiring the operator to materially change his position. From the above it will be obvious that an operation of the handwheel 35 will actuate the gearing 32. 33 and 34 to simultaneously rotate the shafts 28 and 29, while an operation of the hand wheel 35ª will rotate the counter shaft 35 and gearing 37, 38, 32ª, 33ª and 34ª to thereby bring about a simultaneous operation of the shafts 28ª and 29ª. As the shafts 28, 29 and 28ª, 29ª are thus actuated they will be caused to screw into or out of the bosses 30 and thereby will horizontally shift the boxes 19, 20 and 19ª, 20ª in co-operating pairs to correspondingly adjust the rolls 17 and 17ª relatively to the aforesaid electrodes, in directions toward and away from each other. In this way the rolls 17 and 17ª are capable not only of being adjusted to accommodate tubing of varying diameters, but are also arranged to be set to bring the seams of such tubing into proper welding relation to the previously mentioned electrodes, and to exert the desired side pressure on said tubing for properly closing the seam thereof during the welding process.

To increase the efficiency of the machine, the table or farme 16 may further support a tube guide consisting for instance of a member 39 adapted to project into the seam of said tube and maintain in proper registry with the rolls 17 and 17ª. The member 39 is clamped upon a block 40 dovetailed into a vertical guide 41 in which said block is vertically adjustable by means of an adjusting screw 42 fixed in an adjusted position by means of lock nuts 43. To enable the member 39 to be horizontally shifted relatively to the rolls 17 and 17ª the block 41 is slidably mounted on a guide plate 44 and is adjusted thereon by means of an adjusting screw 45 and hand wheel 46, as shown in Fig. 4.

As shown in Figs. 1 and 2 the base 15 is provided with upright standards 47 which constitute supports for brackets 48 projecting therefrom in horizontal directions at a distance above the base 15 and the frame or table 16. To provide the desired rigidity of structure the free ends of said brackets 48 are preferably supported in any conventional manner, as by means of upright rods 49 mounted upon the base 15 and extending upwardly therefrom as shown in Fig. 1; the rods 49 project through suitable openings in the brackets 48 and preferably are screw-threaded at their upper ends for the accommodation of lock nuts 50 whereby said brackets 48 are rigidly fixed in position. At spaced points the brackets 48 are provided with tubular or other guides 51 in which supporting members 52 are vertically slidable, said members 52 being secured to and adjustably supporting a transformer 53. The latter may be a standard welding transformer with one turn secondary and combination taps 54, and including rotary switches 55 on the primary to provide various voltages; in addition, the transformer 53 may be provided with a conventional blower 56 and connections 57 for keeping said transformer cool in the well known way.

With the arrangement set forth the transformer 53 is vertically adjustable for the purpose of varying the position of the electrodes as will be more fully pointed out hereinafter. Any suitable mechanism may be provided for effecting the vertical adjustment of said transformer 53 and its associated elements and for fixing the same in adjusted positions. For instance, as shown in the illustrated example adjusting screws 58 may be secured to the transformer 53 so as to depend therefrom, suitable arrangements being included to fix said screws 58 against rotation about their axes; as illustrated in Fig. 2 the screws 58 extend through and in threaded engagement with worm gears 59 journalled in the brackets 48 so as to be incapable of movements in axial directions and easily rotatable about their axes. The worm gears 59 are in mesh with worm pinions 60 fixed upon stub-shafts 61 journalled in the brackets 48, one or both of said stub-shafts 61 being provided with crank handles 62 to facilitate the raising and lowering of the transformer 53 and its associated elements. In order to bring about a co-ordinated actuation of both adjusting screws 58 and to avoid interference with the electrodes and other elements to be described more fully hereinafter, each stub shaft 61, in addition, carries a sprocket wheel 63 connected by means of a sprocket chain 64 with a sprocket wheel 65; the latter are each fixed upon a counter shaft 66 suitably journalled in and extending between the brackets 48 as shown in Fig. 1.

With the arrangement described above, it will be obvious that as the crank handle 62 is operated, in one direction or the other, the one stub-shaft 61 and the worm pinion 60 carried thereby, will be rotated, and through the medium of the sprockets 63 and 65, the sprocket chains 64, and the counter shaft 66, will correspondingly actuate the other stub shaft 61 and its worm pinion 60. As this occurs, the worm pinions 60 will bring about a simultaneous rotation of the two worm gears 59 which, as the result of their screw-threaded connection with the non-rotatable adjusting screws 58 will either raise or lower the transformer 53 and the elements carried thereby, to the desired extent. At the same time the mechanism mentioned above will serve to firmly fix the transformer and its associated elements in any adjusted position.

As shown in Fig. 3 the transformer 53 is provided at its lower portion with contact blocks 67 secured to said transformer in a manner to provide efficient electrical contact, and projecting toward each other, said contact blocks 67 terminating at their opposed inner ends in reduced sections 68 spaced apart to provide an air gap 68$^a$, and forming a recess 69, the purpose of which will appear more fully hereinafter. Gibs 70 and 70$^a$ of suitable metal are bolted by bolts 70$^b$ to the contact blocks 67, said gibs being preferably bevelled at the inner edges and arranged in co-operating pairs with the gibs 70 and 70$^a$ of each pair located in spaced parallel relation to constitute guides for slidable members 71, the opposite edges of which are bevelled to fit the bevels of the gibs 70 and 70$^a$. For convenience in assembling and to enable efficient electrical contacts to be made, the gibs 70$^a$ of each pair may be provided with slots 70$^c$ for the accommodation of the bolts 70$^b$ so that said gibs 70$^a$ are relatively adjustable, within the limits of said slots 70$^c$; to enable the gibs 70$^a$ to be forced into firm surface engagement with the members 71 to thereby provide efficient electrical contact between the gibs 70, 70$^a$ and the members 71, screws 70$^d$ are provided, which are in screwthreaded engagement with lugs 70$^e$ depending from the one contact block 67 and are fixed against rotation by lock nuts 70$^f$, said screws 70$^d$ being arranged to abut against the gibs 70$^a$, as shown in Fig. 6. The screws 70$^d$ also serve to prevent unintentional outward shifting of the gibs 70$^a$. Any conventional means may be provided for slidably shifting the members 71 lengthwise of the gibs 70 and 70$^a$; for instance, as shown in Fig. 3, the latter may include recesses in which the headed ends 72 of adjusting screws 73 are rotatably secured, said screws 73 being in screwthreaded engagement with bearings 74 fixed to the contact blocks 67 in any convenient manner. To facilitate the operation of the adjusting screws 73, they may be provided with hand wheels 75 or equivalent devices; in the preferred arrangement the screws 73 carry lock nuts 76 which may be adjusted lengthwise thereof to various set positions for engagement with the lugs 74 to enable the contact housings 77 to be easily restored to a former position subsequently to a shifting from such position for any purpose. The members 71 are clamped or fastened in the operation positions in positive surface engagement with the contact blocks 67 by bolts 71$^a$ which pass through slots 71$^b$ with which the members 71 are provided, as shown in Fig. 7; the slots 71$^b$ permit the slidable adjustments of the members 71 which are desirable, and the bolts 71$^a$ serve to establish an efficient electrical contact between said members 71 and the contact blocks 67.

As shown in Fig. 3, the members 71 constitute supports for contact housing 77 which preferably comprise integral parts of said members 71 and depend therefrom in spaced opposed relation to each other; in the preferred arrangement, water jackets 77$^a$ or other means whereby cooling of the housing 77 may be effected, are provided therein. The housings 77 are constructed of suitable metal having a high electric conductivity such as copper, and are recessed as indicated at 78 to form annular flanges 79 which at their upper portions are provided with depending projections 80, the purpose of which will be more fully pointed out hereinafter. The contact housings 77 include bosses 81 located in axial registry and cored out as indicated at 82 for the accommodation of plugs 83 which carry anti-friction bearings of any suitable and conventional type; for the purpose of adjustment the plugs 83 are in screwthreaded engagement with the bosses 81 and are fixed in the cores 82 in adjusted positions by brass set screws 84 of which there are preferably four for each plug 83. The latter each consist of two separate sections $a$ and $b$ telescopically fitted together and serving as carriers for the ball races $c$ and $d$ and the ball bearings $e$ which in the illustrated example constitute the aforesaid anti-friction bearings; the sections $a$ and $b$ are detachably fastened together by means of screw bolts $f$ as shown in Fig. 3.

The ball races $d$ are fitted upon the reduced ends 85 and against the shoulders 85$^a$ of a shaft 86 which, with this arrangement, spans the space between the two contact housings 77 and is journalled in the ball bearings $e$ or equivalent anti-friction devices, suitable insulation 87 being provided to electrically insulate said shaft from the antifriction bearings and the contact housings 77, as shown in Fig. 3. The shaft 86 carries the circular electrodes 88 which are of the twin type consisting of two sections insulated from each other and from the shaft 86 by suitable insulation 89 and secured together in the form of a unit by means of bolts or the like 90; the latter are insulated from the electrodes in any conventional manner as by means of insulation 91 as indicated in Fig. 3. Any convenient method may be employed for fixing the electrodes 88 upon the shaft 86, as for instance by pressing or forcing the same thereon. The location and arrangement of the parts is such that the electrodes 88 project into the recess 69 formed at the inner ends of the contact blocks 67. The electrodes 88 include annular bosses 92 which project axially in opposite directions from said electrodes 88 and are rotatively positioned within the recesses 78 of the contact housings 77 as illustrated in Fig. 3. The outer diameter of the bosses 92 is less than the recesses 78 so that, in practice, annular spaces are provided between the outer circumferential faces of the flanges 79; furthermore the axial dimensions of the parts are such that, in the assembled condition of the machine spaces will exist between the free end faces of the bosses 92 and the contiguous faces of the recesses 78. For maintaining the electrodes in the desired condition of coolness, water or other cooling medium is supplied thereto through pipes 93 which terminate in nozzles 94 projecting downwardly into the spaces which exist between the electrodes 88 and the contact housings 77 as indicated in Fig. 3. To increase and prolong the cooling effect of the cooling medium the bosses 92 preferably are provided with pockets 95 located at spaced intervals circumferentially of said bosses in close proximity to the electrodes 88 as illustrated in Fig. 3; these pockets 95 are adapted to receive and hold parts of the cooling medium and to retain the same until, by rotation of the electrodes 88 said pockets 95 become successively inverted and thus discharge their contents. The projections 80 previously referred to herein, serve to direct the water or other cooling medium which issues from the the nozzles 94 and to prevent it from escaping in lateral directions.

The electric current is passed from the contact housings 77, which receive it from the transformer 53, to the electrodes 88 by contact members or brushes which preferably are of the special construction now about to be described and themselves constitute a novel feature of the instant invention.

The contact brushes in question are constructed of flexible copper wire and preferably of fine stranded copper cable, arranged in masses to form mop-like members 96 which are inserted into recesses 97 provided in the vertical bottom faces of the recesses 78 of the contact housings 77, which constitute carriers of high electric conductivity for said contact brushes; the members 96 are all cut so as to have the same length and project out of the recesses 97 into contact with the free end faces of the bosses 92 of the electrodes 88 as shown in Fig. 3. Any suitable means may be provided for securing the brush contacts 96 in the recesses 97; for instance, tapered wedge screws 98 such as are shown in Fig. 8 may be used for this purpose, in which case tapped sub-recesses are provided at the inner ends of the recesses 97 for the reception of the screwthreaded ends of said screws 98. The latter pass centrally through the mop-like masses of wires composing the brush contacts 96, and on being screwed into the aforesaid sub-recesses develop wedging actions whereby said brush contacts 96 are securely clamped against the walls of the recesses 97 and thus firmly fixed in place therein.

Auxiliary brush contacts 96$^a$ constructed in the same way as the contacts 96 of flexibly fine and preferably stranded copper wires to form mop-like members, are secured in the recesses 97$^a$ of metallic carriers 97$^b$ by means of wedge screws 98$^a$ as shown in Fig. 8. The carriers 97$^b$, which in the illustrated example may be termed auxiliary carriers, are externally screwthreaded at 99 and are arranged to be screwed into internally threaded openings 100 which are provided at spaced intervals in the flanges 79 of the contact housings 77 so as to be located circumferentially of the bosses 92 of the electrodes 88; the brush contacts 96$^a$ project in radial directions out of the openings 100 into surface contact with the peripheral or circumferential surfaces of said bosses 92 and provide additional means for supplying the electric current to the electrodes 88. For the purpose of easily adjusting the auxiliary brush contacts 96$^a$, the carriers 97$^b$ thereof are provided with heads 101 having diametric slits 102 for the accommodation of a screw driver or other suitable tool; when the auxiliary brush contacts 96$^a$ are in place in the machine the slits 102 are recessible through the internally screwthreaded openings 100 which extend entirely through the flanges 79 of the contact housings 77 as illustrated in Fig. 3.

To cause the brush contacts 96 and 96$^a$ to develop ideal electrical contacts and to provide for proper lubrication thereof, the contact housings 77 include channels or holes 103 through which flaked graphite or its equivalent may be spouted on the aforesaid brush contacts 96 and 96$^a$ as will be clear from an inspection of Fig. 3.

In practice the tube A, after it has been properly shaped by the forming mechanism, is introduced into the welding machine with the open seam of the tube on top, the member 39 of the tube guide extending into said seam to prevent unintentional rotation of said tube A about its axis and to guide it in proper position to the welding mechanism. The tube A passes between the side pressure rolls 17 and 17ª which develop a pressure thereon which brings the edges of the tube A along the seam into close abutting contact with each other. While thus held under side pressure by the rolls 17 and 17ª the tube A passes into engagement with the electrodes 88 as shown in Fig. 3 so that the aforesaid edges of said tube A are welded together to form a butt weld in the well known way.

During the operation of the machine the electric current passes from the transformer contact blocks 67 to the contact housings 77 and to the brush contacts 96 and 96ª which serve to transmit the electric current to the electrodes 88. While the current is passing through the electrodes 88 to effect the welding of the tube A, water or other cooling medium is being supplied thereto from the nozzles 94 for cooling purposes; the cooling effect is increased and prolonged because of the fact that the pockets 95 become filled therewith and thus continuously provide a number of pools of cooling fluid which absorb heat from the electrodes 88 with a maximum efficiency and are discharged as the pockets gradually assume inverted positions due to the rotation of the electrodes.

It will be understood that the side pressure rolls 17 and 17ª are adjusted laterally by shifting the boxes 19, 20 and 19ª, 20ª, through the medium of the hand wheels 35 and 35ª and associated gearing, to develop the required side pressure upon the tube A, and also to properly position said tube with respect to the electrodes 88. The rolls 17 and 17ª are also vertically adjusted by means of the sleeves 23, to suit the line up of the rest of the mechanism.

The contact housings 77 are adjusted, by means of the hand wheels 75 and co-operating mechanism, to bring the brush contacts 96 into proper contact with the free end faces of the bosses 92 of the electrodes 88; the arrangement in question permits a very fine adjustment of the brush contacts 96 against the end faces of the electrodes, so that the pressure exerted by said brush contacts 96 can be regulated to any extent with little effort and as much or as little pressure as is necessary to effect the most efficient operation may easily be developed in said brush contacts 96. The adjustability of the parts referred to above also permits the contact housings 77 to be shifted relatively to the shaft 86 to permit the latter with the electrodes 88 to be readily removed whenever this may be desirable or necessary. The electrodes 88 may be easily adjusted to the exact centre of the machine or to any other predetermined operative position by adjusting the blocks 83 in the recesses 82 of the bosses 81 to thereby shift the shaft 86 in axial directions as may be necessary; when the proper position has been reached the parts are firmly locked against disarrangement by means of the set screws 84.

The adjustment of the auxiliary brush contacts 96ª to bring them into proper engagement with the peripheral surfaces of the bosses 92 of the electrodes 88, and to develop the desired degree of pressure in said contacts 96ª, is effected by screwing the carriers 99 into or out of the openings 100 of the flanges 79 of the contact housings 77 to whatever extent may be necessary.

The aforesaid adjustments of the contact housings 77 and the adjustment of the auxiliary brush contacts 96ª relatively to said contact housings 77 also makes it easily possible to compensate for wear in said brush contacts, so that the latter may be maintained in efficient engagement with the end faces and the peripheral surfaces of the electrode bosses 92 throughout the entire life of said contact brushes 96 and 96ª.

By designing the electrodes 88, in the manner illustrated in the drawings, with oppositely extending bosses and with relatively small axial bores just large enough to accommodate the shaft 86, which itself may be of relatively small diameter, a maximum amount of contact surface is provided upon the end faces of said bosses, which is supplemented by the circumferential or peripheral surfaces of said bosses constituting additional contact surfaces for the distribution of the electric current to the electrodes 88. As a result of the large amount of contact surface provided within a relatively short radial distance, the diameter of the electrodes 88 may be reduced to a minimum so that the distance from the transformer 53 to the centre of the shaft 86 may be relatively short. This makes the length of the secondary circuit correspondingly short and reduces to a minimum the electrical reactance, which, in existing machines, is relatively high. In addition to this the contact housings 77, which support the shaft 86, and carry the current to the electrodes 88 are located in close proximity to the latter and thus provide a very narrow loop; this serves to still further reduce the electrical inductance effect, as the closer the said housings 77 are together in parallel, the less will be the loss in reactance. In other words the construction and arrangement is such that the welding machine is as compact as possible, while at the same time the aggregate contact surface available for electrical distribution to the electrodes is extremely large.

The novel form of brush contacts, examples of which are shown at 96 and 96ª, particularly when used in combination with graphite constitute a highly efficient means for conducting the current to the electrodes, and in addition serve to keep down the friction between contacts; the efficiency of the brush contacts is still further increased because standard, soft fine stranded copper cable may be used in their construction. As a result the cost of installation and maintenance is thus materially reduced in the instant welding machine.

Because of the inherent softness of the brush contacts 96 and 96ª, and their ability to easily adapt themselves to any surface conformation, efficient electrical contacts are secured without much pressure against the electrodes, so that the latter rotate freely even with the relatively large area of contact which is a feature of the new machine.

The construction lends itself particularly to the welding of large heavy metallic tubing which requires rigidity and an extremely large amount of current. With existing designs a welding machine constructed for such work would require the electrodes to be of very large diameter, so that the secondary circuit would be correspondingly long and develop very heavy reactance losses whereby the efficiency of the machine would be cut down very seriously and produce a very low power factor. As a result even with large machines as presently designed the operative effectiveness is comparatively small over smaller machines as now constructed. With the novel machine herein illustrated and described great volume of current can be transmitted even though the machine as a whole is small and very compact.

While the novel brush contacts 96 or 96ª are primarily designed for use in a machine of the construction set forth herein, it will be obvious that they may be effectively used in other types of welding machines with equal efficiency, or in any electrical machines requiring contact brushes.

Various changes in the specific forms shown and described may be made within the scope of the claims without departing from the spirit of the invention.

I claim:—

1. In an electrical welding machine, the combination of contact housings connected with a source of electricity, an electrode rotatably mounted in said housings and provided with end and circumferential contact faces, and contact devices carried by said housings and engaging respectively the end and circumferential contact faces of said electrode to transfer electrical current thereto.

2. In an electrical welding machine, the combination of contact housings connected with a source of electricity and provided with circular recesses, a twin electrode journalled in said housings, circular bosses projecting from said electrode in opposite axial directions and extending into said recesses with their circumferential and end faces spaced from the corresponding surfaces thereof, and contact devices carried by said housings and projecting beyond the circumferential and end faces of said recesses into engagement with the corresponding faces of said bosses for transferring electric current to said electrode.

3. In an electrical welding machine, the combination of a transformer, contact housings in electrical connection with and depending from said transformer and adjustable thereon in directions toward and away from each other, a twin electrode rotatably mounted in said housings and provided with circumferential and end contact faces, contact devices carried by said housings and projecting in axial directions into engagement with the end faces of said electrode, means for adjusting said housings to adjust said contact devices relatively to said end faces, and additional contact devices carried by said housings and projecting in radial directions into engagement with the circumferential contact faces thereof, said additional electrodes being individually adjustable on said housings relatively to said circumferential faces.

4. In an electrical welding machine, the combination of a transformer, contact housings in electrical connection with and depending from said transformer, said housings being provided with circular recesses, gibs secured to said transformer and constituting guides on which said housings are adjustable toward and away from each other, a twin electrode journalled in said housings in spaced relation thereto, means for introducing a cooling fluid into the spaces between said housings and electrode for cooling the latter, groups of contact members carried by said housing and projecting axially and radially therefrom into engagement with said electrode, said housings being provided with apertures through which graphite may be applied to said contact members, means for adjusting said housings along said gibs relatively to said electrode, and means whereby said housings are cooled.

5. In an electrical welding machine, the combination of a support, a transformer carried by said support and vertically adjustable thereon, contact housings in electric connection with and depending from said transformer, a circular electrode journalled in said housings, a plurality of groups of contact members carried by said housings and projecting therefrom in axial and radial directions into engagement with said electrode, and means for vertically adjusting said transformer, contact housings and electrode on said support.

6. In an electrical welding machine, the combination of a base, a pair of overhanging brackets supported on said base, upright rods vertically slidable on said brackets, a transformer carried by said rods, contact housings in electrical contact with and depending from said transformer, a circular electrode journalled in said housings, contact members carried by said housings and projecting therefrom into engagement with said electrode, a frame mounted on said base, side pressure rolls mounted on said frame and vertically and horizontally adjustable thereon, and mechanism whereby said transformer, contact housings and electrode are vertically adjustable relatively to said side pressure rolls.

7. In an electrical welding machine, the combination of a support, an electrode rotatably mounted thereon, means for supplying electric current to said electrode, a frame on said support, side pressure rolls, boxes slidably mounted on said frame and constituting journals for said side rolls, and means for slidably adjusting said boxes on said frame whereby said side rolls are adjusted relatively to each other and to said electrode.

8. In an electrical welding machine, the combination of a support, an electrode journalled on said support, means for supplying electric current to said electrode, a frame carried by said support, boxes slidably mounted on said frame, side pressure rolls rotatably mounted in said boxes, means for vertically adjusting said side pressure rolls relatively to said electrode, and means for slidably adjusting said boxes whereby said side pressure rolls are laterally adjusted relatively to each other and to said electrode.

9. In an electrical welding machine, the combination of a support, an electrode rotatably mounted on said support, means for supplying electric current to said electrode, a frame carried by said support, boxes slidably mounted on said frame in co-operating pairs, vertical shafts mounted in said boxes, side pressure rolls fixed upon said shafts, screwthreaded sleeves in threaded engagement with certain of said boxes for vertically shifting said shafts relatively to said boxes whereby said side pressure rolls are vertically adjustable independently of each other, and gearing for slidably adjusting the boxes of each pair in unison whereby said side pressure rolls are laterally adjusted relatively to each other and to said electrode.

10. In an electrical welding machine, the combination of a support, an electrode rotatably mounted on said support, means for supplying electric current to said electrode, and side pressure rolls mounted on said support and adapted to be adjusted in vertical and radial directions relatively to each other and to said electrode.

11. In an electrical welding machine, the combination of a base, a pair of overhanging brackets supported on said base, upright rods vertically slidable on said brackets, a transformer carried by said rods, contact housings in electrical contact with and depending from said transformer, a circular electrode journalled in said housings, contact members carried by said housings and projecting therefrom into engagement with said electrode, screwthreaded adjusting screws depending from said transformer, worm gears mounted on said brackets in screwthreaded engagement with said adjusting rods, worm pinions in mesh with said worm gears, means for operatively connecting said worm pinions with each other, and a crank handle directly connected with one of said worm pinions whereby the latter are actuated to operate said worm gears and thereby raise and lower said transformer, contact housings and electrode.

12. In an electrical welding machine, the combination of a base, a pair of overhanging brackets supported on said base, upright rods vertically slidable on said brackets, a transformer carried by said rods, gibs mounted in co-operating pairs on the lower part of said transformer, contact housings in electrical contact with said transformer and slidably mounted in each pair of gibs, means for slidably shifting said contact housings lengthwise of said gibs in directions toward and away from each other, a circular electrode journalled in said housing, contact members carried by said housings and projecting therefrom into engagement with said electrode. screwthreaded adjusting screws depending from said transformer, worm gears mounted on said brackets in screwthreaded engagement with said adjusting rods, worm pinions in mesh with said worm gears, means for operatively connecting said worm pinions with each other, and a crank handle directly connected with one of said worm pinions whereby the latter are actuated to operate said worm gears and thereby raise and lower said transformer, contact housings and electrode.

13. In an electrical welding machine, the combination of a transformer, contact blocks carried by said transformer and projecting toward each other, said contact blocks terminating in reduced ends spaced apart to form an air gap and a recess, contact housings depending from said contact blocks and slidable thereon in directions toward and away from each other, said contact housings having circular recesses in opposed relation to each other, bosses forming part of said contact housings, plugs removably mounted in said bosses, anti-friction bearings carried by said plugs, a shaft journalled in said anti-friction bearings, a twin electrode carried by said shaft and projecting into the recess formed by said contact blocks, bosses forming part of said twin electrode and extending into the recesses of said contact housings, brush contacts carried by said housings and projecting therefrom in axial directions into engagement with the end faces of said electrode bosses, and auxiliary brush contacts carried by said housings and extending therefrom in radial directions into engagement with the circumferential surfaces of said electrode bosses.

14. In an electrical welding machine, the combination of a transformer, contact housings in electrical contact with and depending from said transformer, a circular electrode journalled in said housings, bosses forming part of said electrode and provided with cups located at spaced intervals circumferentially of said bosses in proximity to said electrode, brush contacts carried by said housings and projecting therefrom in axial and radial directions respectively into engagement with the end and circumferential surfaces of said electrode bosses, and means for passing a cooling fluid over said bosses and into the cups thereof for maintaining said electrode in a cool condition.

15. An electrical contact device comprising an electrically conductive carrier provided with a recess, a mop-like mass of highly flexible copper wires inserted into said recess and projecting outwardly beyond the same, and means for securing said mass of wires in said recess.

16. An electrical contact device comprising an electrically conductive carrier provided with a recess, a mop-like mass of highly flexible copper wires inserted into said recess and projecting outwardly beyond the same, and a wedge screw extending centrally through said mass of wires into screwthreaded engagement with said carrier for clamping said mass of wire in said recess.

17. An electrical contact device comprising an electrically conductive carrier provided with a recess, an externally screwthreaded carrier of high electric conductivity provided with a recess, a brush contact consisting of a mop-like mass of highly flexible stranded fine copper wires inserted into the recess of said screwthreaded carrier and projecting outwardly beyond the same, and means for clamping said mass of wires in said last named recess.

18. A contact means for electrical welding machines comprising a metallic carrier of high electric conductivity and provided with a plurality of recesses, brush contacts consisting of mop-like masses of highly flexible stranded fine copper wires mounted in said recesses and projecting outwardly beyond the same, and means for independently securing each brush contact in operative position.

19. A contact means for electrical welding machines comprising a metallic carrier of high electric conductivity provided with two independent groups of recesses extending in directions transverse to each other, one group of recesses being internally screwthreaded, brush contacts consisting of mop-like masses of highly flexible stranded fine copper wires inserted directly into one group of recesses and projecting outwardly therefrom, means for securing said brush contacts in said recesses, externally screwthreaded auxiliary carriers provided with recesses and threaded into the internally threaded recesses of said first carrier, auxiliary brush contacts consisting of mop-like masses of highly flexible stranded fine copper wires inserted into the recesses of said auxiliary carriers, and means for securing said auxiliary brush contacts in said last named recesses.

In testimony whereof I have hereunto set my hand.

MAXWELL H. SUSSMAN.